United States Patent [19]

Riseberg et al.

[11] 4,004,178

[45] Jan. 18, 1977

[54] WHITE LIGHT SOURCE

[75] Inventors: Leslie A. Riseberg, Sudbury;
Alexander Lempicki, Wayland;
Charles Brecher, Lexington; Herman O. Dressel, Lynnfield, all of Mass.

[73] Assignee: GTE Laboratories Incorporated, Waltham, Mass.

[22] Filed: Oct. 3, 1974

[21] Appl. No.: 511,896

[52] U.S. Cl. .............................................. 313/468
[51] Int. Cl.² ....................................... H01J 29/20
[58] Field of Search .............. 313/468; 252/301.4 P

[56] References Cited

UNITED STATES PATENTS

| 3,104,226 | 9/1963 | Struck | 252/301.4 P |
| 3,813,613 | 5/1974 | Danielmeyer et al. | 252/301.4 X |
| 3,863,177 | 1/1975 | Damen et al. | 252/301.4 P |

*Primary Examiner*—Robert Segal
*Attorney, Agent, or Firm*—Irving M. Kriegsman; Bernard L. Sweeney; Leslie J. Hart

[57] ABSTRACT

A white light source is described in which a trivalent metallic ultraphosphate is irradiated with a low voltage electron beam. The metallic ions are generally restricted to the lanthanide rare earth ions and yttrium. The material so irradiated emits light in a spectral continuum centered in the visible portion of the electromagnetic spectrum. This emission is, however, in addition to any narrow bandwidth light emission of the type generally associated with a transition of the metallic ion involving the electrons of the 4f shell.

9 Claims, 2 Drawing Figures

WHITE LIGHT SOURCE

BACKGROUND OF THE INVENTION

The invention described herein was made in the course of or under a contract or subcontract thereunder with the U.S. Navy.

This invention is generally related to light sources and is more particularly concerned with a novel, highly efficient cathodoluminescent source of white light.

A great deal of time and money has been expended recently on the development of new processes, configurations and materials for the generation and control of light. These developments may be generally divided into two categories.

The first category are the coherent light sources known as lasers which may be used in a wide variety of applications including communications, medical, scientific, and industrial apparatus. Such monochromatic sources have been found in glass, crystalline, gaseous and fluid mediums.

The second general category of development has been in the area of broad spectrum sources of light. When these sources are centered in the visible portion of the electromagnetic spectrum, they are generally described as white light sources. Many different materials and configurations have been and are being examined in an attempt to locate more efficient and more lasting broadband sources. Such broadband light sources serve a wide variety of useful purposes in modern technological society. In addition to the simple generation of light for lighting purposes, materials are desired which respond to an external stimulus, such as are found in display applications. Another application in which such materials are desired is on the screen of a cathode ray tube which in turn is used in a multitude of applications.

SUMMARY OF THE INVENTION

It is, therefore, an object of the present invention to provide a new and novel source of white light which is adaptable to a variety of different applications.

It is a second object of the invention to provide such a source which generates light in a broad spectral band at high efficiency.

Accordingly, the invention in its broadest aspect is a source of white light including a low voltage electron beam source and a grounded anode plate toward which the low voltage electron beam is directed. Means are provided for controlling the geometry of the low voltage electron beam and the intersection of that beam with the anode plate. A quantity of material of the general formula $MP_5O_{14}$ is disposed on and in electrical contact with the anode plate at the intersection of the low voltage electron beam. M is a trivalent metallic ion selected from the group consisting of: lanthanum, cerium, praseodymium, neodymium, promethium, samarium, europium, gadolinium, terbium, dysprosium, holmium, erbium, thulium, ytterbium, letetium, yttrium, and mixtures of a plurality of these ions. When irradiated with the electron beam, the material emits light in a broad spectral continuum centered in the visible portion of the electro-magnetic spectrum exclusive of any emission associated with a transition of the trivalent metallic ion involving an electron of the 4f shell.

A specific source of white light according to the invention utilizes a source of an electron beam which is disposed in an evacuated chamber and which operates in a voltage range between 1 and 10 kilovolts and delivers the electron beam with a beam current in the range between 1 and 500 microamperes. Also located in the evacuating chamber is a grounded anode plate toward which the electron beam is directed. The anode plate is oriented so that the electron beam is generally normal to a planar surface of the anode plate. A crystal of the material as described above is disposed on and in electrical contact with the planar surface of the anode plate so that the electron beam is incident thereon. A charge-dispersing film is emplaced over the entire exposed surface of the crystal and is in electrical contact with the anode plate. Means are provided for focussing and controlling the electron beam so as to irradiate a portion of the crystal whose surface area is in the range between 0.25 and 4 $mm^2$. This apparatus also produces a broad spectral emission of white light.

These and further objects, advantages and features of the invention will be apparent from the following detailed description of the preferred embodiments taken together with the accompanying drawing.

DETAILED DESCRIPTION OF THE PREFERRED EMBODIMENTS

Figure 1:
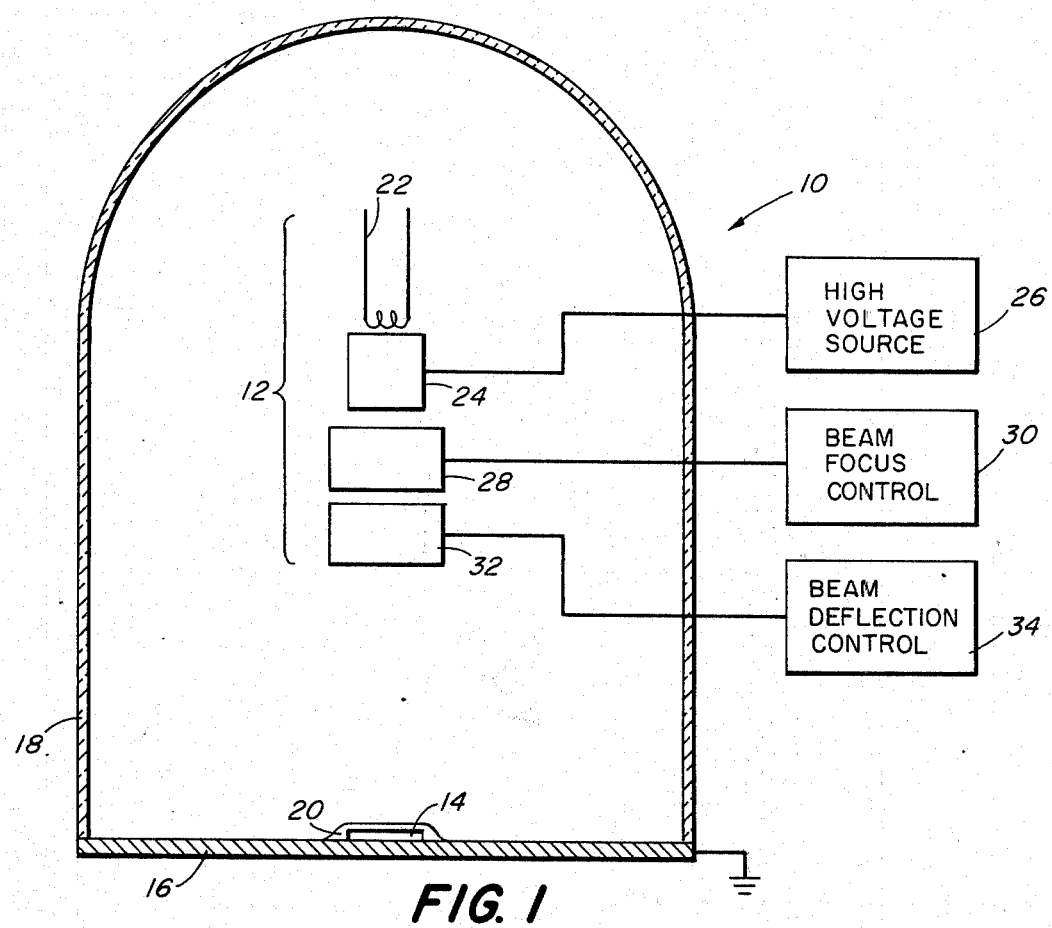
FIG. 1 is a schematic representation of a preferred embodiment of the present invention.

A great deal of research in recent times relative to the development of new light sources has been spent in the examination of various materials which include rare earth ions. The primary motivation for this interest in the rare earth ions is that this class of ions is characterized by having a completed outer shell of electrons and an incomplete inner shell, the 4f shell, in which certain electronic transitions may occur between specific energy states. A number of these transitions from a high energy state to a low energy state occur with the release of energy in the form of light, i.e., these ions exhibit fluorescence. The light emissions so generated in turn are characterized as existing in extremely narrow spectral bands. Therefore, various of the rare earth ions, such as neodymium, ytterbium, and erbium have been used as dopants in various crystalline and glass hosts to form laser active material. Recently, it has also been found that laser action is achievable when the rare earth ions are a primary constituent in a crystalline host.

We have discovered that certain crystalline materials in which the rare earth ions are also utilized as a primary constituent are capable of generating wide-band white light when exposed to a low voltage electron beam. These materials may be characterized generally as rare earth ultraphosphates. These compounds have the general formula $MP_5O_{14}$. "By generally characterized," we mean that M in the foregoing formula is a trivalent metallic ion selected from the group consisting of: lanthanum, cerium, praseodymium, neodymium, promethium, samarium, europium, gadolinium, terbium, dysprosium, holmium, erbium, thulium, ytterbium, lutetium, yttrium, and mixtures of a plurality of the foregoing elements. The property which is exhibited by these materials is known as cathodoluminescence which refers to the luminescence of the material as a result of bombardment of that material with an electron beam.

The mechanism by which the broadband cathodoluminescence occurs within the so called rare earth ultraphosphates of the present invention is presently not completely understood. The cathodoluminescence which has been observed does not correspond to any known excitation mechanism of the system. The fundamental band-gap lies deep in the ultraviolet portion of the electro-magnetic spectrum. Therefore, the emission from the material probably does not correspond to that associated with any intrinsic band of the material. This hypothesis is consistent with the observation that the emission is not generated by the absorption of light or x-rays. In addition, control experiments performed on other insulating materials indicate that the cathodoluminescence is not generated extrinsically to the ultraphosphate material.

The results of our research to date suggest that the cathodoluminescence is associated with what may be described as surface states in the crystalline material. The rare earth ultraphosphate molecules exist with long chains of atoms. Necessarily, such a balanced stoichiometric compound can not exist at the surface of the crystal or at a fault within the crystal. In other words, there is a transition from the pure rare earth ultraphosphate in a balanced state to some different compound at the fault or surface locations. Therefore, the energy states of the various rare earth ion sites in the material are likely to vary from one state immediately at the surface to the balanced state in the interior of the material. With the shallow penetration depth and high energy associated with the electron beam, this electron beam may be uniquely suited to the excitation of such variable energy levels of the material in the transition portion of the crystal.

This hypothesis is supported by the observation that the direction of incidence of the electron beam on the crystalline material appears to affect the ease with which cathodoluminescence occurs. Generally, the greatest ease occurs with the application of the electron beam parallel to a major crystalline direction, either a surface or fault plane in the crystal.

Referring now to FIG. 1, there is shown an apparatus according to the present invention for generating white light which is referred to generally by the reference numeral 10. The source of white light 10 is generally comprised of three major components; an electron gun 12, a specimen of the selected rare earth ultraphosphate material 14, and a grounded anode plate 16 on which the ultraphosphate material 14 is disposed in the path of the electron beam generated by the gun 12. In order that the apparatus have a significant lifetime and commercial practicality, it presently appears that an evacuated chamber 18 is necessary in which the foregoing major components are located. A vacuum pump 35 is shown schematically as a means for evacuating the chamber 18.

The electron gun 12 is comprised generally of a filament 22, a cathode 24, focusing plates 28 and deflection plates 32. A suitable high voltage source 26 is connected to the cathode 24 to control the intensity of the electron beam. A beam focus control circuit 30 and a beam deflection control circuit 34 of conventional design are connected to the focusing plates 28 and the deflection plates 32 respectively such that the geometry of the electron beam and its point of incidence on the grounded anode plate 16 may be controlled. In this manner, the material 14 may be irradiated by the electron beam at an edge or other position of interest and the area and shape of the irradiated area may be selected at will to maximize performance.

In order to reduce the possibility of a charge buildup on the insulating material of the crystal 14, it is preferred that a charge-dispersing material layer 20 be deposited over the entire exposed surfaces of the material 14 and in contact electrically with the grounded anode plate 16. The charge-dispersing layer 20 may be formed of any conductive material which does not react chemically with the rare earth ultra-phosphates. Typically, the layer of charge-dispersing material is a thin layer, for example, approximately 75 A, of aluminum.

The rare earth ultraphosphate materials utilized in the apparatus of the present invention may be prepared by any practical method including precipitation from a phosphoric acid solution, by direct reaction between the rare earth oxide and phosphorus pentoxide or by reaction between the rare earth oxide and ammonium orthophosphate.

A procedure which has been found feasible for producing materials for use in the apparatus of the present invention is the growing of rare earth ultraphosphate crystals from a phosphoric acid solution at temperatures ranging from about 300° to about 750° C. The starting materials were research grade rare earth oxides and an 85% solution of phosphoric acid. The best quality materials are prepared by slow evaporation of solutions at about 500° to 650° C. Approximately one to two grams of rare earth oxides are dissolved in approximately 50 milliliters of phosphoric acid. Higher temperatures and/or higher rare earth oxide concentrations can cause too rapid crystallization in an open system with a concomitant reduction in material quality. The rare earth oxide is dissolved by heating the solution to at least 300° C and the excess water is removed by boiling. The crucible is then covered and placed in the furnace at the desired temperature. Crystal growth takes place over a period ranging from approximately one day to two weeks. The process parameters are relatively unchanged by the particular selection of rare earth oxide utilized. The crucible utilized should be one that does not react with any of the materials. Vitreous graphite appears to be the best material although boron nitride or precious metals may be used.

As a specific example of the present invention, a terbium ultraphosphate crystal was prepared according to the aforenoted process. The resulting crystal was mounted on a grounded anode plate and overlayed with a charge-dispersing coating of aluminium whose thickness was approximately 75 A. An electron beam was applied to the crystal with a Griffths type 5 AD electron gun operating at 3.5 kilovolts and 60 microamperes beam current. The area of the crystal bombarded by the electron beam was approximately 2mm$^2$. The spectral output of the light source was measured and is graphically illustrated in FIG. 2 of the Drawing. A solid line curve 36 represents the uncorrected response of the spectrometer plotted against the wavelength in A. A separate dotted line curve 38 is shown which has approximately taken into account the correction for the response of the spectrometer and the photomultiplier. Curve 38 represents approximately the actual spectral output of the terbium ultraphosphate material. It can be seen that the output is in a broad spectral band centered at approximately 5800 A. This curve approximates that spectrum which when perceived by the normal human eye, appears to be very pleasing white light.

Figure 2:
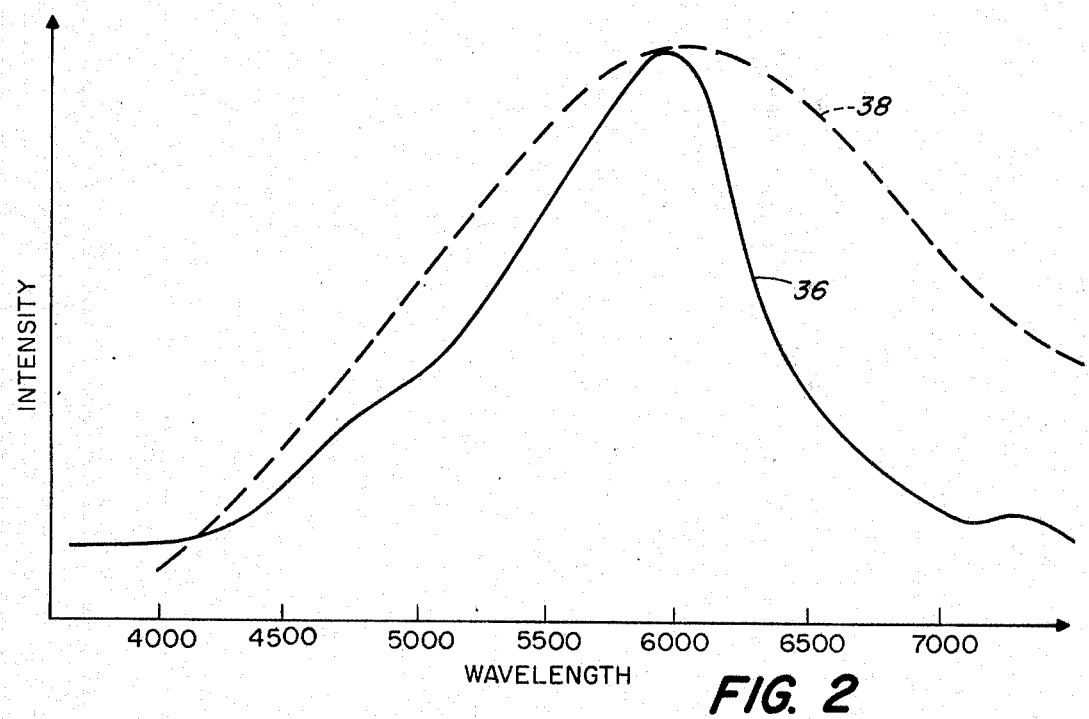
FIG. 2 is a graphical representation of the output spectrum generated by the apparatus of FIG. 1 utilizing a typical metallic ultraphosphate material according to the present invention.

The response curve set forth in FIG. 2 of the drawing is very typical of the response curves acquired with the full range of rare earth ultraphosphate materials. The particular rare earth ion utilized in the ultraphosphate appears to have little effect on the shape of the spectral response curve. Slight shiftings of the spectral response curve have been noted; however, these shifts are such as to not alter the essential white light quality of the emission from the material. Similar results are attained when mixtures of various rare earth ions are incorporated in the ultraphosphate material.

Relative to the apparatus shown in FIG. 1 of the Drawing, it presently appears that certain limited ranges of operational parameters are more effective in attaining the desired results. Therefore, in the presently preferred embodiments of the invention, the electron beam source may be operated between approximately 1 and 10 kilovolts and the electron beam current between 1 and 500 microamperes. The area of the crystal under bombardment by the electron beam is preferably in the range of 2.5 and 4mm². Furthermore, the internal pressure in the evacuated chamber is largely controlled by the contaminants contained in the gas. Preferably, when air is the fill in the evacuated space, the pressure should be reduced to between $10^{-4}$ and $10^{-7}$ Torr.

While there have been shown and described what are considered to be preferred embodiments of the present invention, it will be apparent to those of ordinary skill in the art that various changes and modifications may be made therein without departing from the spirit of the invention as defined in the appended claims.

We claim:

1. A source of white light comprising
   a low voltage electron beam source,
   a grounded anode plate toward which the low voltage electron beam is directed,
   means for controlling the geometry of the low voltage electron beam on the anode, and
   a quantity of material having the general formula $MP_5O_{14}$ disposed on and in electrical contact with the anode plate at the intersection of the low voltage beam, where M is a trivalent metallic ion selected from the group consisting of: lanthanum, cerium, praseodymium, neodymium, promethium, samarium, europium, gadolinium, terbium, dysprosium, holmium, erbium, thulium, ytterbium, lutetium, yttrium, and mixtures of a plurality thereof, the material thereby emitting light in a broad spectral continuum centered in the visible portion of the electro-magnetic spectrum and exclusive of any emission associated with a transition of the trivalent metallic ion involving electrons of its 4f shell.

2. A source of white light according to claim 1, wherein the low voltage electron beam source, the grounded anode plate, and the quantity of material are disposed in an evacuated chamber.

3. A source of white light according to claim 2, wherein the low voltage electron beam is directed generally normal to a planar surface of the grounded anode on which the quantity of material is disposed.

4. A source of white light according to claim 3, wherein a charge-dispersing film is emplaced over the entire exposed surface of the material and in electrical contact with the grounded anode plate.

5. A source of white light according to claim 4, wherein at least a portion of the material is oriented so that the low voltage electron beam is incident thereon in a direction parallel to a major crystallographic plane.

6. A source of white light comprising
   means enclosing an evacuated space,
   a low voltage electron beam source being disposed in the evacuated space and operating in the range between about 1 and 500 microamperes,
   a grounded anode plate toward which the electron beam is directed generally normal to a planar surface thereof being located in the evacuated space,
   a crystal of a material having the general formula $MP_5O_{14}$ disposed on and in electrical contact with the planar surface of the anode plate so that the electron beam is incident thereon, M being a trivalent metallic ion selected from the group consisting of: lanthanum, cerium, praseodymium, neodymium, holmium, erbium, thulium, ytterbium, lutetium, yttrium, and mixtures of a plurality thereof,
   a charge-dispersing film being emplaced over the entire exposed surface of the crystal and in electrical contact with the anode plate,
   means for focussing the electron beam so as to irradiate a portion of the crystal whose surface area is in the range between 0.25 and 4mm² so that light having a broad spectral continuum centered in the visible portion of the electromagnetic spectrum is emitted by the crystal and is exclusive of any emission associated with a transition of the trivalent rare earth ion involving the electrons of the 4f shell.

7. A source of white light according to claim 6, wherein the crystal is oriented on the planar surface so that the low voltage electron beam is incident thereon in a direction parallel to a major crystallographic plane.

8. A source of white light according to claim 7, wherein the charge-dispersing layer is a thin film of conductive material deposited over the crystal.

9. A source of white light according to claim 8, wherein the evacuated space has a pressure in the range between $10^{-4}$ and $10^{-7}$ Torr.

* * * * *